C. RANSON.
PREPARATION OF ZINCATE SOLUTIONS.
APPLICATION FILED JULY 8, 1910.
1,023,964.
Patented Apr. 23, 1912.
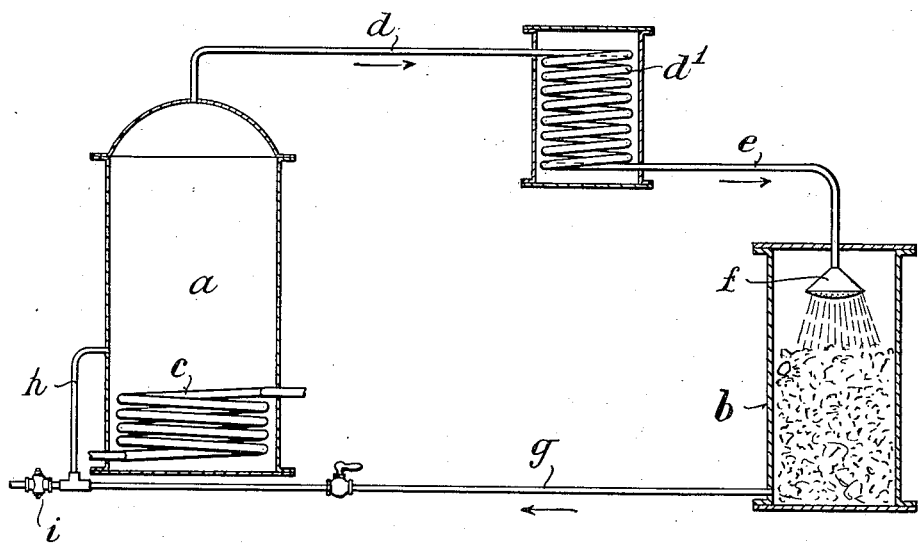
WITNESSES:
Fred White
J. F. Wallace
INVENTOR:
Charles Ranson,
By his Attorneys
Fraser, Dunk & Myers

UNITED STATES PATENT OFFICE.

CHARLES RANSON, OF PARIS, FRANCE.

PREPARATION OF ZINCATE SOLUTIONS.

1,023,964.  Specification of Letters Patent.  Patented Apr. 23, 1912.

Application filed July 8, 1910. Serial No. 570,956.

*To all whom it may concern:*

Be it known that I, CHARLES RANSON, of 2 Rue Poncelet, Paris, France, have invented certain new and useful Improvements in the Preparation of Zincate Solutions, of which the following is a specification.

This invention relates to the preparation from zinc oxid ores or from roasted zinc blendes, of pure solutions of zincates suitable for instance for the manufacture of caustic alkalis and zinc sulfid pigments. According to the process described in U. S. Patent No. 818,192 granted to me in 1906 I prepare such solutions by the action of caustic alkalis or alkaline earths on metallic zinc, when hydrogen gas is obtained as a by-product. Where the latter by-product possesses little or no commercial value and zinc ores are readily available it is however more economical to prepare the zincate solutions from the ores direct, if necessary after they have been previously calcined in the known way to convert the ore into oxid of zinc. For example ores containing blende (sulfid of zinc) may be heated to a high temperature in contact with air. The zinc sulfid is thus oxidized, giving oxid of zinc and sulfurous anhydrid. Ores containing calamin (carbonate of zinc) will be calcined at the temperature of incipient red heat, the carbon dioxid is evolved and the oxid of zinc liberated. I have however found that by digestion of the zinc ore with solutions of caustic alkalis or alkaline earths, although zinc oxid is dissolved out in the form of zincate, the extraction is either imperfect and the degree of concentration too low for practical purposes, or the solutions are contaminated to such an extent by silica and other impurities likewise dissolved from the ore, that they are unsuitable for the uses contemplated.

I have now discovered a method whereby relatively very pure and concentrated solutions of zincates or zinc oxid in caustic alkalis can be prepared from ores, without the caustic alkali coming into direct contact with the ore. For this purpose I employ ammonia in the first place as a solvent, which does not attack the silica of the ore, and my process is based upon the volatility and selective solvent action of ammonia. In place of solutions of caustic alkalis, solutions of alkaline earths, for example barium hydroxid or strontium hydroxid, may be employed, which compounds are hereinafter and in the claims included in the description "alkali."

In order to carry the invention into effect I introduce into a distilling apparatus a solution of caustic soda or other alkali of the desired degree of concentration, together with a suitable quantity of ammonia solution. The alkali solution used may for example contain 25 to 26 per cent. of caustic soda (NaOH) or an equivalent proportion of caustic potash (KOH) or of earth alkaline hydrate, but it may contain less. The ammonia solution used for the extraction may be of any concentration, but I prefer to use a solution containing about 200 grams of ammonia ($NH_3$) per liter. On heating the distilling apparatus, ammonia and aqueous vapor are driven off and conducted through an overhead refrigerator, from whence the condensed ammoniacal liquor is distributed over the crushed or roasted ore contained in a closed filter. The ammoniacal liquor percolates through the ore and charged with the dissolved zinc oxid is allowed to drain back into the caustic soda solution contained in the distilling vessel, where the zinc oxid is retained as zincate of soda, and the ammonia is again evaporated to repeat the cycle of operations without loss. The dissolved zinc oxid thus gradually accumulates in the caustic soda liquor until the desired degree of concentration of zincate of soda is attained, the filter being replenished with zinc ore as it becomes exhausted. When the desired degree of concentration of the zincate solution is attained, say when the solution on analysis shows a content of 160 grams ZnO per liter, the solution can be run off and filtered. Constituents of zinc ore other than zinc oxid which may have been dissolved out by ammonia (such as hydrated oxids of iron, copper, or other metals) can be precipitated from the filtered solution by addition of a sufficient quantity of finely divided zinc metal and removed by filtration or decantation in order to be worked up further as desired.

By this process it is possible to treat even ores poor in zinc oxid with advantage, as the heat necessary to evaporate and circulate the ammonia is small. If the ore contains zinc carbonate it may be transformed into oxid by addition of quick lime or barium hydroxid in the necessary proportions.

The accompanying drawing represents diagrammatically an apparatus for carrying out the invention.

*a* indicates a still into which the caustic or other alkali solution and the ammonia solution are introduced, and in which the dissolved zinc oxid extracted by the ammonia from the ore in the vessel *b* gradually accumulates. The still *a* is heated by an internal steam coil *c*, and the ammonia driven off from the liquid in the still passes on by the pipe *d* to the coil of a condenser *d'* where it is condensed and passes on by the pipe *e* to the vessel *b* in which it is distributed over the charge of zinc ore by the spraying head *f*. The ammonia solution of zinc oxid passes away from the vessel *b* to the still *a* by the pipes *g*, *h*, and the circulation through the apparatus continues until the zincate solution has attained the desired degree of concentration. The solution can then be run off by the cock *i*.

What I claim and desire to secure by Letters Patent is:—

1. A continuous process of preparing concentrated solutions of alkali zincates from ores containing zinc oxid, comprising the following steps in repeated series; treating the ore with ammonia water, mixing the resulting solution with the solution of an alkali, distilling off the ammonia and steam from the mixture, and condensing the ammonia and steam to produce ammonia water, whereby the process is conducted as a continuous cycle, substantially as specified.

2. A continuous process of preparing concentrated solutions of zincate of soda from ores containing zinc oxid, comprising the following steps in repeated series; treating the ore with ammonia water, mixing the resulting solution with a solution of caustic soda and distilling off the ammonia and steam, and condensing the same to produce ammonia water, whereby the process is conducted as a continuous cycle, substantially as specified.

In witness whereof, I have hereunto signed my name in the presence of two subscribing witnesses.

CHARLES RANSON.

Witnesses:
THOMAS LAING WHITEHEAD,
FRANK RUSSAK.